UNITED STATES PATENT OFFICE.

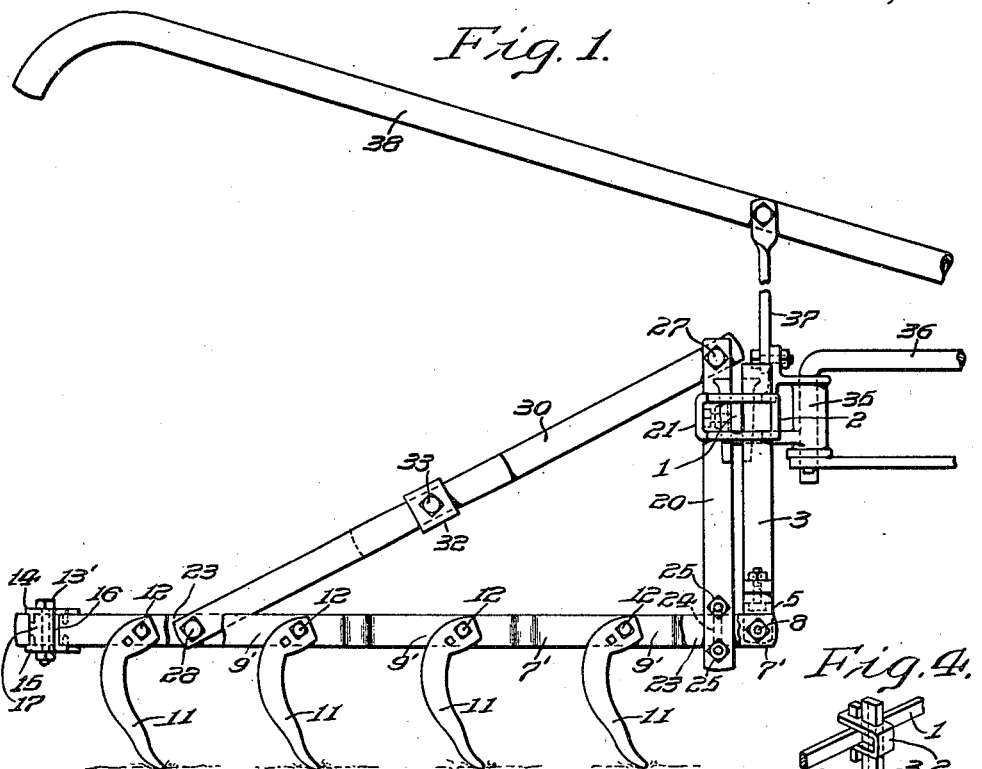

JOSEPH MADER, OF PHILADELPHIA, PENNSYLVANIA, ASSIGNOR TO S. L. ALLEN & CO., INC., A CORPORATION OF PENNSYLVANIA.

CULTIVATOR.

1,380,918.  Specification of Letters Patent.  Patented June 7, 1921.

Application filed August 2, 1920. Serial No. 400,701.

*To all whom it may concern:*

Be it known that I, JOSEPH MADER, a citizen of the United States, and a resident of Philadelphia, county of Philadelphia, State of Pennsylvania, have invented certain new and useful Improvements in Cultivators, of which the following is a specification, reference being had to the accompanying drawing.

My invention relates more particularly to cultivators intended for use with small hand controlled tractors commonly known as "garden tractors" which ordinarily comprise a pair of traction wheels on which is supported a power unit and from which rearwardly and upwardly extend a pair of handles by means of which the tractor is guided by the operator who walks in the rear of the machine, suitable means being employed for connecting the tractor with some form of agricultural implement, such as a cultivator or the like, which the tractor serves to draw over the ground.

Among the principal objects of my invention are to provide a cultivator suitable for employment with a tractor of the character aforesaid adapted to simultaneously cultivate a relatively large area and in which means are provided whereby adjustment may be effected to increase or decrease the width of the said area; to provide a cultivator having rearwardly converging side tool-carrying bars and comprising means whereby the said bars may be adjusted and retained in substantially parallel relation with the surface of the ground being cultivated or other predetermined position; and to provide a cultivator which, when connected in operative relation with a garden tractor, will not interfere with the operator of the tractor as he walks behind the same during the cultivating operation.

Other objects of my invention are to provide a cultivator of the character aforesaid which is simple in construction and design, not liable to get out of order or be damaged through rough usage, which embodies a plurality of ground working implements so arranged as to effect the cultivation of an area of maximum extent and in which means are provided for effecting adjustment and support of certain of the parts so that the depth to which the ground working implements enter the soil may be regulated as desired and the several implements arranged to effect a substantially similar depth of cut.

My invention further includes all of the other various objects and novel features of construction and arrangement hereinafter more definitely specified and described.

While it will be understood that the present invention is adapted for use with any suitable tractive means, it may be particularly advantageously employed in connection with a garden tractor of the ordinary form and I have, therefore, in the accompanying drawing shown the cultivator in connection with such parts of a garden tractor as are requisite for a proper understanding of the invention, but it will be understood that I do not thereby desire or intend to limit myself to the employment of the cultivator solely with a garden tractor as other tractive means may be utilized if desired.

In the said drawing, Figure 1 is a fragmentary side elevation of a preferred embodiment of my invention, portions of one of the tool-carrying bars being broken away for the sake of clearness, showing the same connected in operative relation with certain parts of a garden tractor; Fig. 2 is a fragmentary top plan view of the cultivator shown in Fig. 1 and also showing a part of the connecting means by which it may be secured to the tractor; and Figs. 3 and 4 are respectively fragmentary perspective views on a somewhat reduced scale of certain details of the invention.

The form of the invention shown in the drawings comprises a transversely extending supporting or gang bar 1, to which are adjustably secured in any suitable manner, conveniently by the clamps 2, a pair of vertically disposed supports 3 (only one of which is shown) the lower end of each support being turned outwardly substantially at right angles to the vertical portion of the support, as best shown in Fig. 4, and provided with a depending lug 5 which may be either integral with the support or bolted thereto. These lugs serve for the attachment of the forward ends of the rearwardly converging tool carrying side bars 7—7', the forward end of each bar being preferably secured to the adjacent lug by means of a horizontally positioned bolt 8 so that the side bar will be capable of vertical movement with respect to the lug. Each of the side bars is formed to provide a plurality of tool or blade seats 9—9', the several seats of each bar being preferably arranged in parallel relation with each other and in slightly angular relation with the bar 1 and being connected by diagonally disposed portions 10, as best shown in Fig. 2. It will of course be understood that while the side bar 7' is not completely shown in the drawings it is of the same configuration as side bar 7, and is disposed similarly to the latter but on the opposite side of the center line of the implement, and is similarly attached to a support 3 carried by the bar 1. The blade seats 9—9' are adapted for the reception of the upper ends of the cultivating blades or tools 11 which are suitably preferably removably secured to the side bars as by bolts 12 or in any other convenient manner, the particular form or design of the blades forming no part of the present invention.

Each of the side bars adjacent its rearmost extremity is preferably bent on itself to form an eye adapted for the passage of one of the bolts 13—13' which extend through the upper and lower plates 14 and 15 of a member 16. The plates are held in spaced relation above and below the side bars by the vertical wall 17 of the member which latter may either be formed as a single casting or as an integral unit pressed out of sheet metal, the whole arrangement being such that each side bar is capable of movement in a horizontal plane with respect to the member about its respective pivot bolt 13 or 13'.

For the purpose of adjustably supporting the member 16 and the rearmost extremities of the side bars from the gang bar suitable means are provided, which may preferably comprise a vertically extending bar 20 adjustably secured to the gang bar 1, preferably at about its center, in any suitable manner as, for example, by a suitable clamp 21 adapted, when loosened, to permit the bar 20 to be adjusted vertically as well as longitudinally of the bar 1. Adjacent the lower end of the bar 20 means are provided for receiving the forward end of a longitudinally and rearwardly extending center bar 23, which means may conveniently comprise a substantially U-shaped clamp 24 having its free threaded ends extending through suitable apertures in the bar 20 and provided with nuts 25, the arrangement being such that the forward end of the center bar 23 may be passed through the clamp 24 and drawn against the side of the bar 20 either tightly or only sufficiently close to hold the bar 23 in position while affording a certain amount of play between it and the bar 20. The rearmost end of the bar 23 is arranged to pass through a suitable aperture in the vertical wall 17 of the member 16, a pair of bolts 26 disposed one on each side of the bar and extending through the upper and lower plates of the member assisting in maintaining the bar in position.

Hingedly secured to the upper extremity of the bar 20 as by a horizontally disposed pivot bolt 27, and similarly secured adjacent the rearmost extremity of the bar 23, as by a pivot bolt 28, is a strut 30 which may preferably comprise a pair of overlapping members secured in adjusted relation by a clamp 32 of suitable form, for example, one having a body portion surrounding both members with a set screw 33 threaded therethrough in such manner that by tightening the screw the members may be pressed together and against one side of the slot in the body through which they extend thereby clamping the members in rigid adjusted relation.

In use the cultivator is suitably connected to any convenient form of tractive means such as a garden tractor, preferably by securing to the bar 1 suitable brackets 35 from which forwardly extend draft rods 36 which communicate the tractive effort of the tractor to the implement, means ordinarily being provided for raising and lowering the bar 1 so that the cultivating blades or tools 11 may be withdrawn from or permitted to enter the ground, such means conveniently comprising suitable hangers 37 extending from the brackets 35 to the tractor handles 38 so that by lifting the handles the bar 1 and parts secured thereto may be moved vertically as desired.

It will be evident that with the parts constructed and assembled substantially as hereinbefore described, the forward ends of the tool-carrying side bars may be adjusted vertically through suitable movement of the supports 3, which can be readily effected by loosening the clamps 2, whereby the depth to which the foremost blades 11 will enter the ground when handles 38 are lowered to operative position may be varied as desired. Once this adjustment of the foremost blades is accomplished the side bars may be brought into and operatively supported in substantially parallel relation with the surface of the ground or other predetermined position by suitable adjustment of the members forming the strut 30, so that the blades positioned toward the rear of the side bars may be brought into a position to effect a depth of cut similar to that of the foremost blades, or, should it be desired, a depth of cut greater or less than that of the foremost blades. It will, of course, be understood that the bar 20 may also be adjusted vertically if necessary in effecting the desired positioning of the several parts and to maintain the center bar 23 and the bar 20 substantially at right angles to each other. It will further be evident that by moving the supports 3 longitudinally of the gang bar 1, the side bars may be moved in and out about the pivot bolts 13—13' so that the area or surface of the ground which will in operation be covered by the cultivating blades may be increased or decreased as desired and that this adjustment may be effected independently of and without disturbing the vertical adjustment of the side bars hitherto described.

It will be understood that frequently during the operation of cultivating devices it is desirable to lift the blades clear of the ground by raising the tractor handles 38 and that while under these conditions the lifting force is primarily communicated by the hangers 37 solely to the forward end of the implement, it is thence transmitted through the strut 30 to the rear end thereof as well, so that the latter is raised from the ground equally with the forward end whereby the side bars are thus maintained at all times, whether in raised or lowered position, substantially parallel with the surface of the ground.

Furthermore, it is to be noted that the implement is entirely self-contained and requires no other attachment to or support from the tractive means employed than that necessary to draw it over the ground; and that the tool-carrying side bars are supported and maintained in operative position solely by means carried by and connected to the gang bar, and not from the handles 38 or other part of the tractor, a construction which greatly facilitates the coupling and uncoupling of the cultivator to the tractor, the former thus constituting a complete, unitary machine.

While I have herein illustrated and described a preferred embodiment of my invention, I do not thereby desire or intend to limit myself specifically thereto as suitable modifications in the design, construction and arrangement of the various parts may be made to adapt the invention for use under the varying conditions encountered in practice and with different forms of tractive means without departing from the spirit and scope of the invention as defined in the appended claims.

Having thus described my invention, I claim and desire to protect by Letters Patent of the United States:

1. A cultivating implement comprising a gang bar, supports carried by said gang bar, a pair of rearwardly converging tool-carrying side bars carried by said supports, means connecting said side bars adjacent their rearmost extremities, a center bar, a bar extending from said center bar to said gang bar and supporting means connecting the upper extremity of said bar with said center bar.

2. A cultivating implement comprising a transversely extending gang bar, supports carried by said gang bar and adjustable with respect thereto, tool-carrying side bars extending rearwardly from said supports, means hingedly connecting said side bars adjacent their rearmost extremities, a center bar disposed between said side bars and extending adjacent said connecting means, a vertical bar carried by said gang bar and secured to the forward end of said center bar and adjustable supporting means extending from the upper extremity of said vertical bar to said center bar.

3. A cultivating implement comprising a transversely extending gang bar, a pair of supports carried by said bar and vertically and longitudinally adjustable with respect thereto, a rearwardly extending tool-carrying bar carried by and vertically movable with respect to each of the side bars, means connecting the rearmost extremities of said tool-carrying bars, a vertically adjustable bar carried by said gang bar, a center bar extending from said vertically adjustable bar to said connecting means and means connecting the upper extremity of said vertically adjustable bar with said center bar.

4. A cultivating implement comprising a gang bar, a pair of supports carried by and vertically and longitudinally adjustable with respect to said gang bar, a pair of tool-carrying side bars each side bar being vertically pivoted adjacent its forward end to one of said supports, means hingedly connecting the rear ends of said side bars, a center bar disposed between said side bars and extending adjacent said connecting means, a vertically adjustable bar carried by said gang bar, means for securing the forward end of said center bar adjacent the lower end of said vertically adjustable bar and a strut connecting the upper extremity of said vertically adjustable bar with said center bar.

5. A cultivating implement comprising a transversely extending gang bar, a pair of vertically and longitudinally adjustable supports carried by said gang bar, a tool-carrying side bar vertically pivoted adjacent the lower extremity of each of said supports and extending rearwardly therefrom, each of said bars comprising a plurality of tool seats and diagonally disposed portions connecting said seats, means hingedly connecting the rearmost extremities of said tool-carrying bars, a vertically adjustable bar carried by said gang bar, a center bar disposed between said tool bars and extending between said vertically adjustable bar and said connecting means, means for securing said center bar adjacent its forward end to said vertically adjustable bar, a strut extending from adjacent the upper extremity of said vertically adjustable bar to said center bar and means for adjusting the length of said strut.

6. A cultivating implement comprising a gang bar, supports carried by said gang bar, a tool-carrying bar extending rearwardly from each support, means connecting the rearmost extremities of said tool-carrying bars and adjustable means for raising and lowering the rearmost extremities of said tool-carrying bars in correspondence with the adjusted position of said supports whereby said bars may be operatively supported in predetermined position.

7. A cultivating implement comprising a gang bar, supports carried by said gang bar, a tool-carrying bar extending rearwardly from each support, means connecting the rearmost extremities of said tool-carrying bars and means supported from said gang bar operative to raise and lower the rearmost extremities of said tool-carrying bars in correspondence with the adjusted position of said supports whereby said bars may be operatively supported in predetermined position.

8. A cultivating implement comprising a gang bar, supports carried by said gang bar, a tool-carrying bar extending rearwardly from each support, means connecting said tool-carrying bars adjacent their rearmost extremities, and adjustable means supported from said gang bar operative to maintain said tool-carrying bars in predetermined position.

In witness whereof, I have hereunto set my hand this 30th day of July, A. D. 1920.

JOSEPH MADER.